(12) United States Patent
Yuan

(10) Patent No.: US 11,941,693 B2
(45) Date of Patent: Mar. 26, 2024

(54) CURRENCY INFORMATION PROVISION SYSTEM, DATABASE SERVER FOR CURRENCY INFORMATION PROVISION, CURRENCY INFORMATION PROVISION METHOD, AND CURRENCY INFORMATION PROVISION PROGRAM

(71) Applicant: Glory Ltd., Himeji (JP)

(72) Inventor: Yukari Yuan, Hyogo (JP)

(73) Assignee: GLORY LTD., Himeji (JP)

( * ) Notice: Subject to any disclaimer, the term of this patent is extended or adjusted under 35 U.S.C. 154(b) by 496 days.

(21) Appl. No.: 17/274,486

(22) PCT Filed: Aug. 28, 2019

(86) PCT No.: PCT/JP2019/033782
§ 371 (c)(1),
(2) Date: Mar. 9, 2021

(87) PCT Pub. No.: WO2020/054431
PCT Pub. Date: Mar. 19, 2020

(65) Prior Publication Data
US 2021/0256790 A1    Aug. 19, 2021

(30) Foreign Application Priority Data
Sep. 10, 2018   (JP) .................................. 2018-168801

(51) Int. Cl.
*G06V 10/00*       (2022.01)
*G06F 16/532*      (2019.01)
(Continued)

(52) U.S. Cl.
CPC .......... *G06Q 40/04* (2013.01); *G06F 16/532* (2019.01); *G06F 18/22* (2023.01); *G07D 7/0047* (2017.05); *G07D 7/206* (2017.05); *G06V 10/758* (2022.01)

(58) Field of Classification Search
CPC ..... G06V 10/758; G06F 16/532; G06F 18/22; G06Q 40/04; G07D 7/206
See application file for complete search history.

(56) References Cited

U.S. PATENT DOCUMENTS 9,911,146 B2 *  3/2018  Siegal ................. G06Q 20/085
9,934,504 B2 *  4/2018  Wang ................. G06Q 30/0643
(Continued)

FOREIGN PATENT DOCUMENTS

CN      103955987 A    7/2014
EP       3446673 A1    2/2019
(Continued)

OTHER PUBLICATIONS

International Search Report and Written Opinion dated Nov. 5, 2019, received for PCT Application PCT/JP2019/033782 Filed on Aug. 28, 2019, 9 pages including English Translation.

*Primary Examiner* — Amir Alavi
(74) *Attorney, Agent, or Firm* — XSENSUS LLP

(57) ABSTRACT

A currency information provision system (1) comprises: a database server (2) in which currency image information is stored as one type of currency information about multiple types of currency; and an information processing terminal (3) that acquires target image information (IA), which is image information for a search object, and transmits the target image information (IA) to the database server (2), the database server (2) comparing the target image information (IA) with the currency image information, and thereby searching a candidate currency estimated to be the same type as currency included in the search target, from among the multiple types of currency, and transmitting the currency information (IB) of the candidate currency to the information processing terminal (3), and the information processing terminal (3) providing currency information for the candidate currency.

11 Claims, 6 Drawing Sheets

(51) Int. Cl.
*G06F 18/22* (2023.01)
*G06Q 40/04* (2012.01)
*G07D 7/0047* (2016.01)
*G07D 7/206* (2016.01)
*G06V 10/75* (2022.01)

(56) References Cited

U.S. PATENT DOCUMENTS

| | | | | |
|---|---|---|---|---|
| 10,038,683 B2 * | 7/2018 | Barak | ............. | H04L 63/08 |
| 10,055,727 B2 * | 8/2018 | Aiglstorfer | ......... | G06Q 20/326 |
| 10,104,020 B2 * | 10/2018 | Barak | ............. | H04L 43/08 |
| 10,108,961 B2 * | 10/2018 | Wang | ............. | G06F 21/32 |
| 10,140,620 B2 * | 11/2018 | Heath | ............. | G06Q 30/02 |
| 10,140,666 B1 * | 11/2018 | Wang | ............. | G06Q 40/123 |
| 2019/0354955 A1 * | 11/2019 | Oda | ............. | G01C 21/3874 |

FOREIGN PATENT DOCUMENTS

| | | |
|---|---|---|
| JP | 2001-195628 A | 7/2001 |
| JP | 2001-256530 A | 9/2001 |
| JP | 2015-062128 A | 4/2015 |
| JP | 2017-37530 A | 2/2017 |
| WO | 2017/183533 A1 | 10/2017 |

* cited by examiner

| MONEY TYPE / MONETARY INFORMATION IB | MONEY 10a | MONEY 10b | MONEY 10c | MONEY 10d | ... | MONEY 10z |
|---|---|---|---|---|---|---|
| IMAGE INFORMATION Ib1 | | | | | | |
| INFORMATION OF MONEY CIRCULATION COUNTRY Ib2 | | | | | | |
| DENOMINATION INFORMATION Ib3 | | | | | | |
| UNIT INFORMATION Ib4 | | | | | | |
| EXCHANGE RATE INFORMATION Ib5 | | | | | | |
| SIZE INFORMATION Ib6 | | | | | | |
| MATERIAL INFORMATION Ib7 | | | | | | |
| AUTHENTICITY DISCRIMINATION POINT INFORMATION Ib8 | | | | | | |
| SERIAL NUMBER INFORMATION Ib9 | | | | | | |
| ... | | | | | | |

FIG. 2 ical field

The present invention relates to a monetary information provision system, a database server for monetary information provision, a monetary information provision method and a monetary information provision program which search for foreign currency types.

BACKGROUND ART

In recent years, the number of foreigners visiting Japan for business or tourism has been increasing. When foreigners pay for goods or services in Japan, they need to exchange foreign currency into Japanese yen in advance, but since exchange offices are not always nearby, they may not have enough Japanese yen for the payment. In such a case, the seller or service provider (hereinafter referred to as "seller and the like") may be asked to accept payment in foreign currency from the foreigners.

It is however difficult for typical Japanese sellers and the like to recognize, for example, the authenticity and value (exchange amount to Japanese yen) of a foreign currency that a foreigner is trying to use for payment. It is thus difficult for Japanese sellers and the like to accept payment in foreign currencies. In other words, in order for the sellers and the like to accept the payment in a foreign currency, information about the foreign currency (hereinafter referred to as "foreign currency information") is necessary.

Patent Literature (hereinafter referred to as "PTL") 1 discloses a search system that allows easy recognition of a brought in foreign currency. In this search system, when a user inputs a feature of a banknote into the user terminal in a form of an answer for a question displayed on the screen of the user terminal, the user terminal sends information related to this feature to a server. Based on this information, the server outputs information of money to be a candidate from the database to the user terminal.

CITATION LIST

Patent Literature

PTL 1
Japanese Patent Application Laid-Open No. 2001-256530

SUMMARY OF INVENTION

Technical Problem

In the search system disclosed in PTL 1, a user inputs a feature of a banknote in a form of an answer for a question. Depending on the content of the question, a certain amount of knowledge about banknotes is required for the user to correctly understand the meaning of the question and answer it appropriately. There is a demand for an identification of the type of foreign currency easier than the conventional system.

The present invention is made to satisfy such a demand, and an object of the present invention is to provide a monetary information provision system, a database server for monetary information provision, a monetary information provision method and a monetary information provision program which allow easy identification of the type of foreign currency.

Solution to Problem

For achieving the object, a monetary information provision system of the present invention comprises: a database server that accumulates monetary image information as one of a plurality of types of monetary information of a plurality of types of money; and an information processing terminal that acquires target image information, and transmits the target image information to the database server, the target image information being image information of a search target, wherein the database server searches, by matching the target image information against the monetary image information, for candidate money that is presumed to be the same type as money comprised in the search target from the plurality of types of money, and transmits monetary information of the candidate money to the information processing terminal, and the information processing terminal provides the monetary information of the candidate money.

For achieving the object, a database server for monetary information provision of the present invention comprises: a database that accumulates monetary image information as one of a plurality of types of monetary information of a plurality of types of money; and a control device that searches for candidate money from the plurality of types of money by matching target image information against the monetary image information, and transmits monetary information of the candidate money to an information processing terminal, the target image information being image information of a search target transmitted from the information processing terminal, the candidate money being presumed to be the same type as money comprised in the search target.

For achieving the object, a monetary information provision method of the present invention comprises: preparing a database that accumulates monetary image information as one of a plurality of types of monetary information of a plurality of types of money; acquiring target image information that is image information of a search target; and searching for candidate money from the plurality of types of money by matching the target image information against the monetary image information in the database, and providing monetary information of the candidate money, the candidate money being presumed to be the same type as money comprised in the search target.

For achieving the object, a monetary information provision program of the present invention causes an information processing terminal to execute processing comprising: transmitting target image information to a database server that accumulates monetary image information as one of a plurality of types of monetary information of a plurality of types of money, the target image information being acquired image information of a search target; acquiring monetary information of candidate money from the database server, wherein the candidate money is presumed to be the same type as money comprised in the search target, and the database server searches for the candidate money by matching the target image information against the monetary image information; and providing monetary information of the candidate money.

For achieving the object, a monetary information provision program of the present invention causes an information processing terminal to execute processing comprising: acquiring target image information from an information processing terminal, the target image information being image information of a search target; searching for candidate money from a database accumulating monetary image information as one of a plurality of types of monetary information of a plurality of types of money by matching the target image information against the monetary image information, the candidate money being presumed to be the same type as money comprised in the search target; and transmitting monetary information of the candidate money to the information processing terminal.

Advantageous Effects of Invention

The present invention allows easy identification of the type of foreign currency.

BRIEF DESCRIPTION OF DRAWINGS

FIG. 2 is a schematic diagram illustrating the configuration of a database stored in a storage device of a database server;

DESCRIPTION OF EMBODIMENTS

Figure 1:
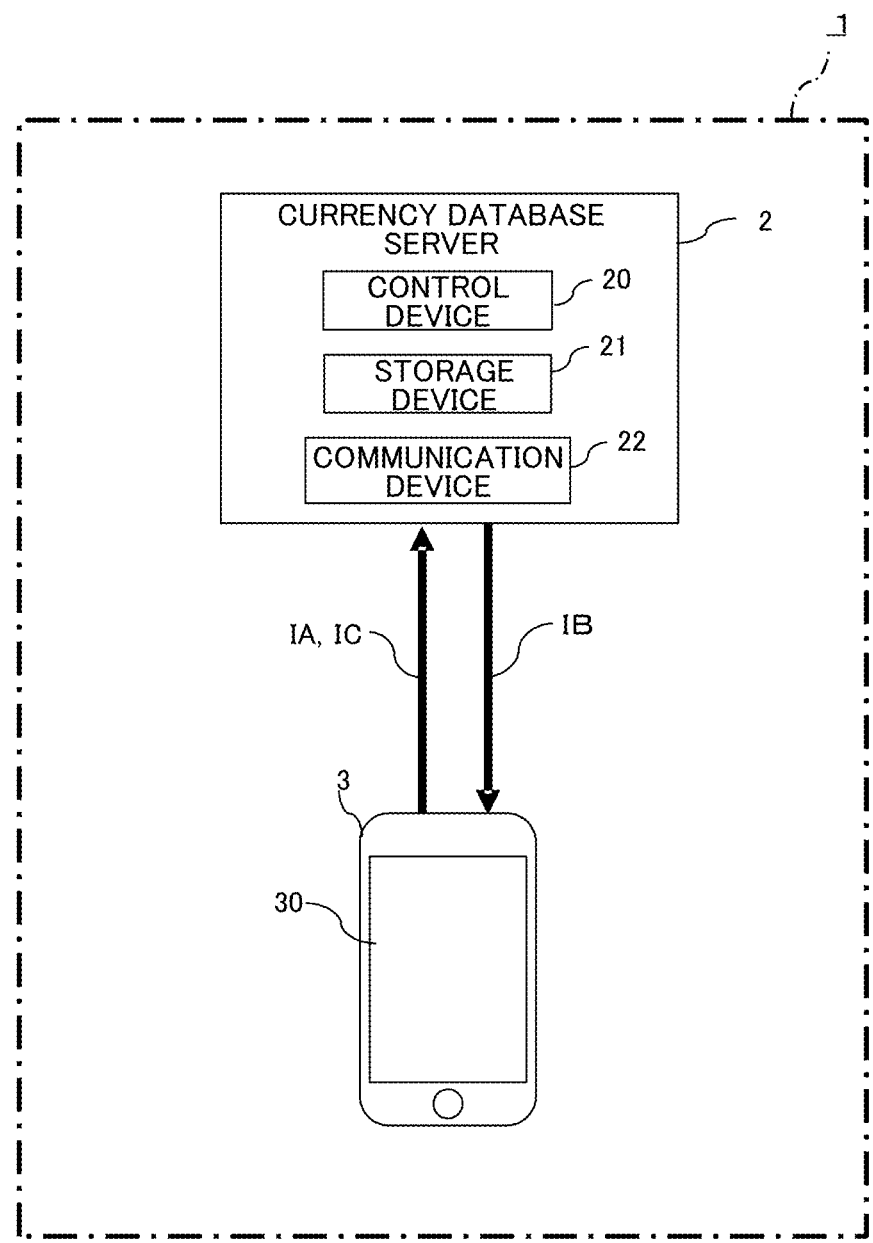
FIG. 1 is a schematic diagram illustrating the overall configuration of a monetary information provision system.

Hereinafter, one or more embodiments of the present invention will be described with reference to the drawings. The embodiments shown below are merely examples, and do not exclude the application of various modifications and techniques not specified in the following embodiments. In addition, each configuration of the embodiments can be variously modified and implemented within the scope of the embodiments. Further, the configurations of the embodiments can be selected as needed or can be combined as appropriate.

In all the drawings for explaining the embodiments, the same elements have in principle the same reference numerals, and the description thereof may be omitted.

Hereinafter, a monetary information provision system, a database server for monetary information provision, a monetary information provision method and a monetary information provision program according to the embodiment of the present invention will be described in detail with reference to the drawings. In the following, the present embodiment will be described for the case where a user operates a user terminal 3 in the user's home country to search for a foreign currency as an example.

[1. Monetary Information Provision System]

The overall configuration of a monetary information provision system 1 of one embodiment will now be described with reference to FIG. 1. FIG. 1 is a schematic diagram illustrating the overall configuration of the monetary information provision system 1.

The monetary information provision system 1 comprises a currency database server (hereinafter, also referred to as "database server") 2, and an information processing terminal (hereinafter, referred to as "user terminal") 3 to be operated by a user. The user terminal 3 is composed of, for example, a smartphone, a personal computer or a tablet computer, and in the present embodiment, the user terminal 3 is composed of a smartphone with a camera function.

The database server 2 and the user terminal 3 can be communicated with each other directly or via a predetermined network such as the Internet.

As will be described in detail below, the user captures an image of one piece of money to be searched (hereinafter, also referred to as "search target money") at hand by using the user terminal 3, and allows the user terminal 3 to acquire an image information IA (target image information) of this money. The user transmits the image information IA and designated country information IC described below from the user terminal 3 to the database server 2. The database server 2 transmits to the user terminal 3 monetary information D3 of candidate money, in a database accumulated in a storage device 21, which is presumed to be the same type as that of the image information IA received from the user terminal 3. When the user terminal 3 receives the monetary information D3 of the candidate money from the database server 2, the user terminal 3 provides the monetary information D3 to the user by displaying the information on a touch panel 30. The monetary information D3 is, for example, the country where the money circulates (i.e., country where the money is made and widely used, hereinafter also referred to as "money circulation country") or the amount of money exchanged in the currency (for example, Japanese yen) of the country (usually the home country) indicated by the designated country information IC.

The search target is a target for which the user requests the database server 2 to search for the candidate money and provide the monetary information D3 of the candidate money. In other words, the search target is money (or what is presumed to be money) whose image is captured by the user with the user terminal 3 in order to transmit the image information IA to the database server 2. The search target is one piece of money in the present embodiment, but the search target may be more than one piece of money.

[2. Database Server]

The database server 2 will now be described with reference to FIG. 2 in addition to FIG. 1. FIG. 2 is a schematic diagram illustrating the configuration of a database 21a stored in the storage device 21 of the database server 2.

As illustrated in FIG. 1, the database server 2 comprises a control device 20, the storage device 21 and a communication device 22.

The database 21a is stored in the storage device 21. As illustrated in FIG. 2, monetary information D3 for each of various domestic and foreign types of money 10a, 10b, 10c, 10d . . . 10z is accumulated in the database 21a. Hereinafter, the term "money 10" is used unless a specific type of money among the money 10a, 10b, 10c, 10d . . . 10z is described.

In the present embodiment, information such as the following is accumulated as monetary information IB in the database 21*a*: image information Ib1 of the money, information of the money circulation country Ib2 of the money (for example, the United States), denomination information Ib3 of the money (for example, a banknote of 100 US$), unit information Ib4 of the money (for example, US dollar), exchange rate information Ib5 (for example, the market value of US dollar against yen), money size information Ib6, money material information Ib7, authenticity discrimination point information Ib8, and serial number information Ib9 for authenticity confirmation.

The authenticity discrimination point information Ib8 is a point for determining whether the money 10 is counterfeit money or not, and for example, is information such as a watermark or hologram at a specific position on a banknote when the money is a genuine note. The serial number information Ib9 is at least one of the serial number of the counterfeit money of this money and the serial number of the genuine money of this money.

Although the exchange rate information Ib5 is simplified to be shown as one item in FIG. 2, the information comprises a plurality of types of exchange rate information. That is, when the money 10*a* is US money, the exchange rate information Ib5 of the money 10*a* comprises not only the market value of the dollar against the yen, but also the market value of the dollar against the Korean won, the market value of the dollar against the Chinese yuan, and the like.

Upon acquiring the image information IA and the designated country information IC from the user terminal 3, the control device 20 (see FIG. 1) sequentially matches the image information IA against image information Ib1 of each money 10 of the database 21*a*. Specifically, the control device 20 matches the image information IA against the image information Ib1 of the money 10*a* to obtain a degree of similarity R of the image, and then matches the image information IA against the image information Ib1 of the money 10*b* to obtain the degree of similarity R, and sequentially repeats the matching until the degree of similarity R of the money 10*z* is obtained. As a method for obtaining the degree of similarity R, a known method for obtaining the degree of similarity of images, such as histogram comparison or feature point matching, may be appropriately used.

The control device 20 determines that money 10 having a high degree of similarity R is candidate money that is presumed to be the same type as the search target money whose image information IA has been transmitted from the user terminal 3. In the present embodiment, four types of money 10 from the money 10 having the highest degree of similarity R to the money 10 having the fourth highest degree of similarity R are determined as candidate money. The control device 20 transmits the monetary information D3 regarding each candidate money to the user terminal 3. In the present embodiment, the control device 20 transmits, as monetary information IB, image information Ib1, exchange rate information Ib5, the size information Ib6 of the money, the material information Ib7 of the money, the authenticity discrimination point information Ib8, and the serial number information Ib9 to the user terminal 3. The control device 20 decides the exchange rate information Ib5 to be used based on the designated country information IC received from the user terminal 3. The control device 20 then uses the exchange rate information Ib5 to convert the amount of money corresponding to the denomination information Ib3 of the candidate money into the amount of money exchanged for the money of the designated country (hereinafter referred to as "exchange amount") EX, and transmits the amount to the user terminal 3.

[3. User Terminal]

A dedicated application (program) is installed on the user terminal 3. By causing the user terminal 3 to execute this dedicated application, the user can receive the provision of the monetary information D3 for the search target money at hand from the database server 2 as described above.

Figure 3:
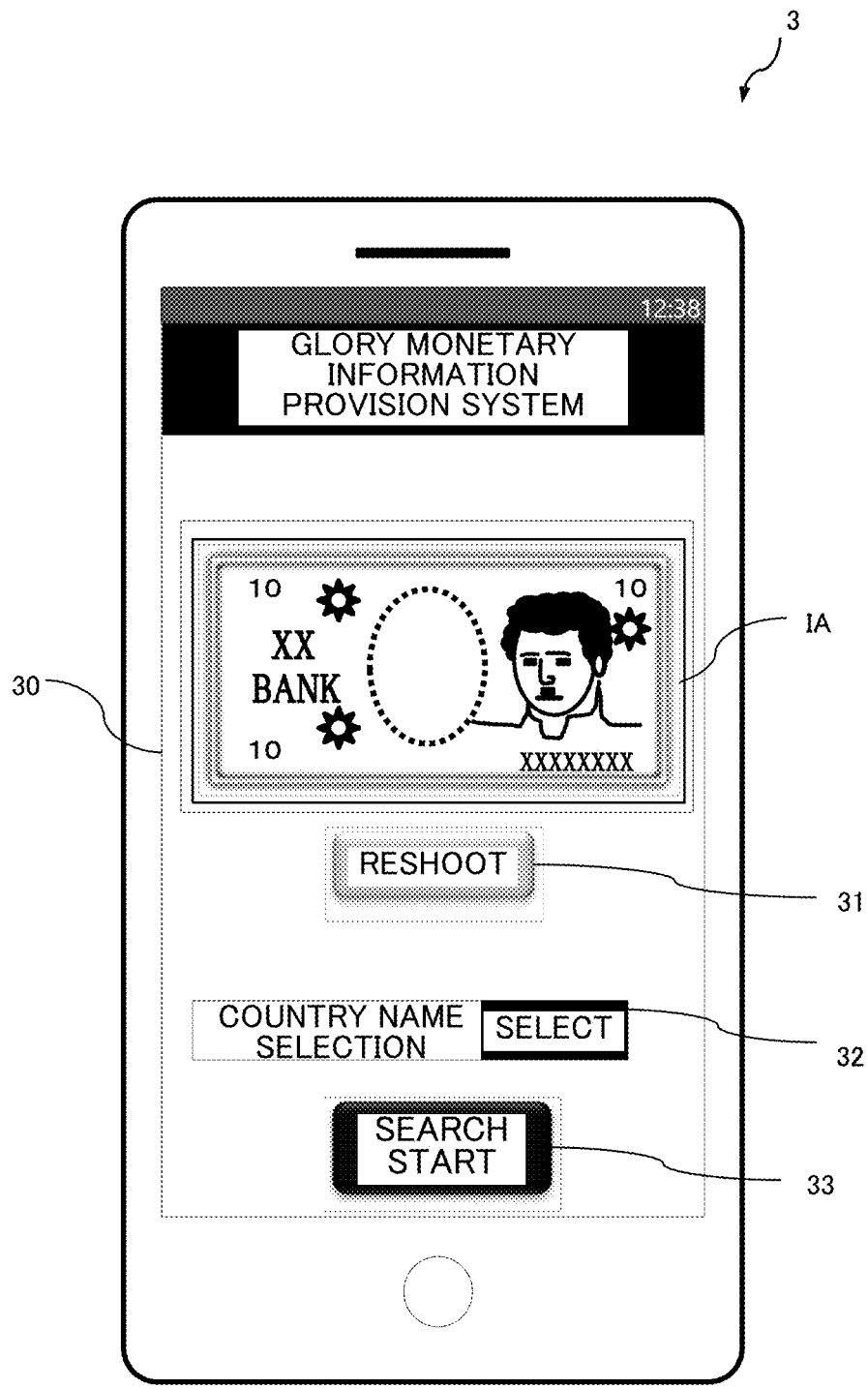
FIG. 3 is a schematic diagram illustrating a user terminal in which an operation unit for transmitting image information of search target money to the database server is displayed on a touch panel.
Figure 4:
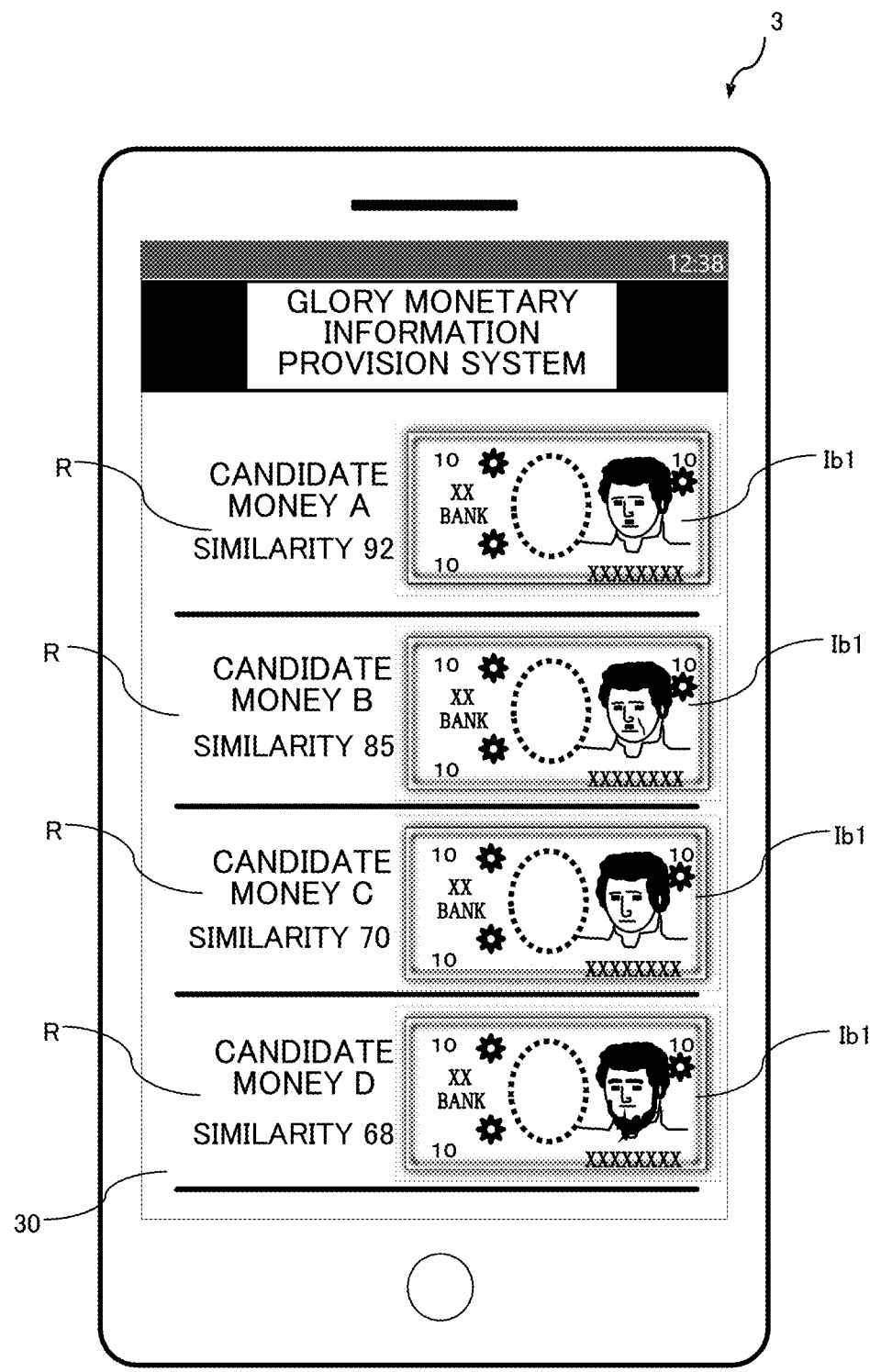
FIG. 4 is a schematic diagram illustrating the user terminal in which candidate money presumed to be the same type as the search target money is displayed on the touch panel.
Figure 5:
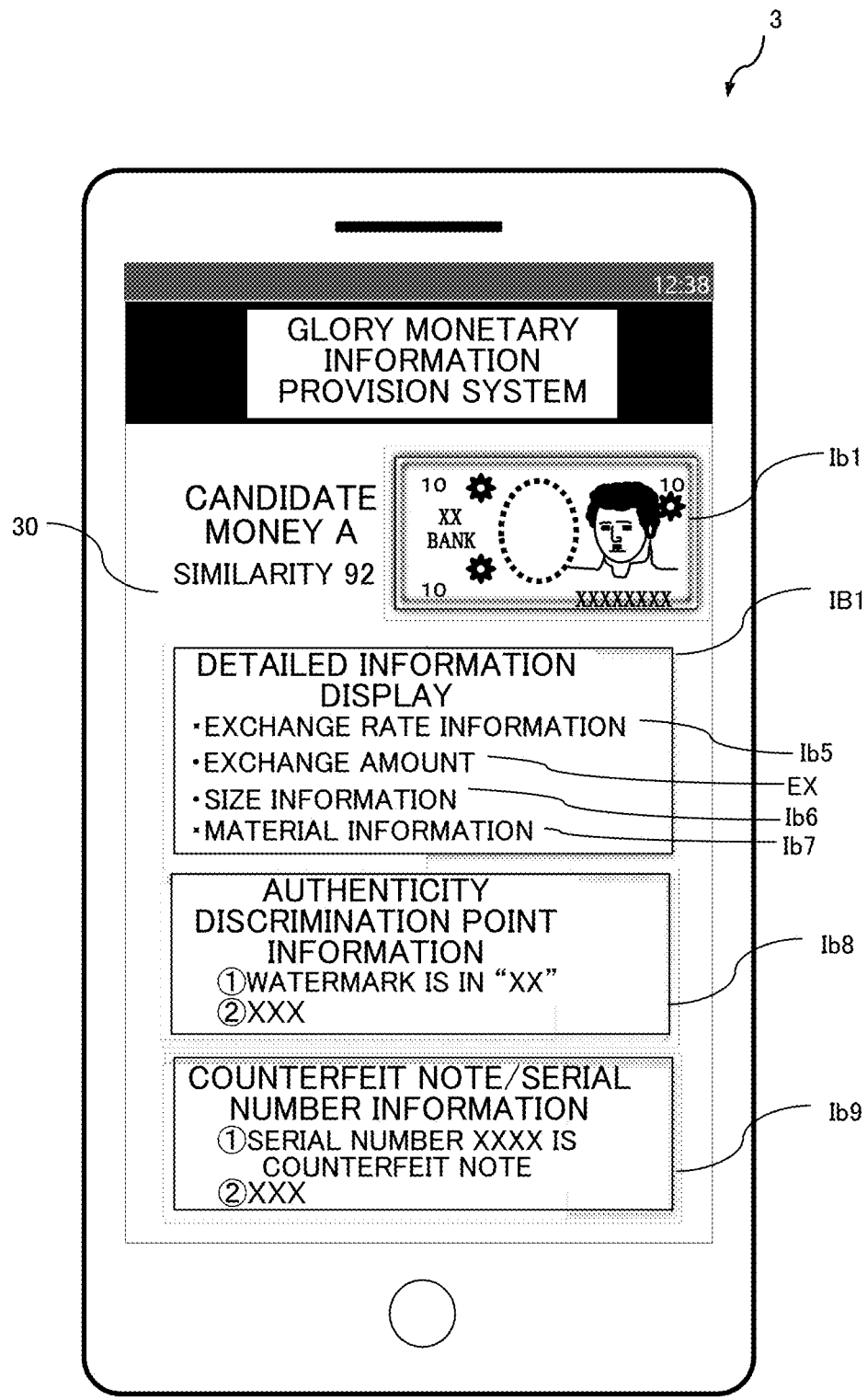
FIG. 5 is a schematic diagram illustrating the user terminal with detailed information of the candidate money displayed on the touch panel.

The provision of the monetary information by the user terminal 3 will now be described with reference to FIGS. 3 to 5. FIG. 3 is a schematic view illustrating the user terminal 3 in which an operation unit for transmitting image information 1A of a search target money to the database server 2 is displayed on a touch panel 30. FIG. 4 is a schematic diagram illustrating the user terminal 3 in which candidate money presumed to be the same type as the search target money is displayed on the touch panel 30. FIG. 5 is a schematic diagram illustrating the user terminal 3 in which detailed information of the candidate money is displayed on the touch panel 30.

When a user causes the user terminal 3 to execute the dedicated application to capture an image of the search target money at hand, the image information IA of the money is displayed on the touch panel 30 as shown in FIG. 3. When the user decides that the image information IA is unclear, the user can capture another image of the search target money by operating a reshoot button 31 displayed on the touch panel 30. Another configuration is possible such that when the function of the dedicated application determines that the image information IA is unclear, the reshoot button 31 is displayed on the touch panel 30, and this display prompts the user to capture another image of the search target money.

A country selection button 32, which is a pull-down button, is displayed on the touch panel 30. A designated country can be selected by operating the touch panel 30. When any designated country is not selected by the country selection button 32, the home country in which the user resides is automatically selected as the designated country. Alternatively, when no designated country is selected by the country selection button 32, the dedicated application may use a position detection function such as a satellite positioning system of the user terminal 3 to specify the country where the user terminal 3 is located, that is, the country where the user is staying as a designated country.

When the user then operates a search start button 33 displayed on the touch panel 30, the image information 1A of the search target money and the designated country information IC indicating the designated country are transmitted to the database server 2.

As described above, when the database server 2 receives the image information IA and the designated country information IC from the user terminal 3, the database server 2 transmits the monetary information D3 comprising the exchange amount EX in the money of the designated country for each of the four types of candidate money having a high degree of similarity R, to the user terminal 3. The exchange amount EX is calculated by the database server 2 based on the denomination information Ib3 and the exchange rate information Ib5. The user terminal 3 displays the received information on the touch panel 30 as shown in FIG. 4. That is, candidate money A with degree of similarity 92, candidate money B with degree of similarity 85, candidate money C with degree of similarity 70, and candidate money D with degree of similarity 68 are displayed in this order from the top according to the height of degree of similarity R.

When the user touches the vicinity of the display of the candidate money A, B, C, or D of the touch panel 30, the display of the touch panel 30 is switched, and more monetary information D3 is displayed on the entire touch panel 30. For example, when the user touches the portion where the candidate money A is displayed in the display of the touch panel 30 shown in FIG. 4, the display of the touch panel 30 is changed as shown in FIG. 5. Specifically, a display of detailed information IB1, the authenticity discrimination point information Ib8, and the serial number information Ib9 of the candidate money A are displayed in addition to the image information Ib1 of the candidate money A.

In the detailed information display IB1, the exchange rate information Ib5, the exchange amount EX, the size information Ib6 of the money, and the material information Ib7 of the money are displayed in this order from the top. Only one of the exchange rate information Ib5 and the exchange amount EX may be displayed.

In the authenticity discrimination point information Ib8, a description such as "watermark is in "XX" is displayed." The name of a part of the banknote is in the "XX."

In the example shown in FIG. 5, the serial number information Ib9 is a serial number of counterfeit money, and a description such as "serial number XXXX is a counterfeit note" is displayed.

The user displays the screen shown in FIG. 5 for each of candidate money types A, B, C, and D and confirms various information in the monetary information IB, and decides whether the search target money corresponds to any of the candidate money types A, B, C, and D, or does not correspond to any of them.

[4. Monetary Information Provision Method]

Figure 6:
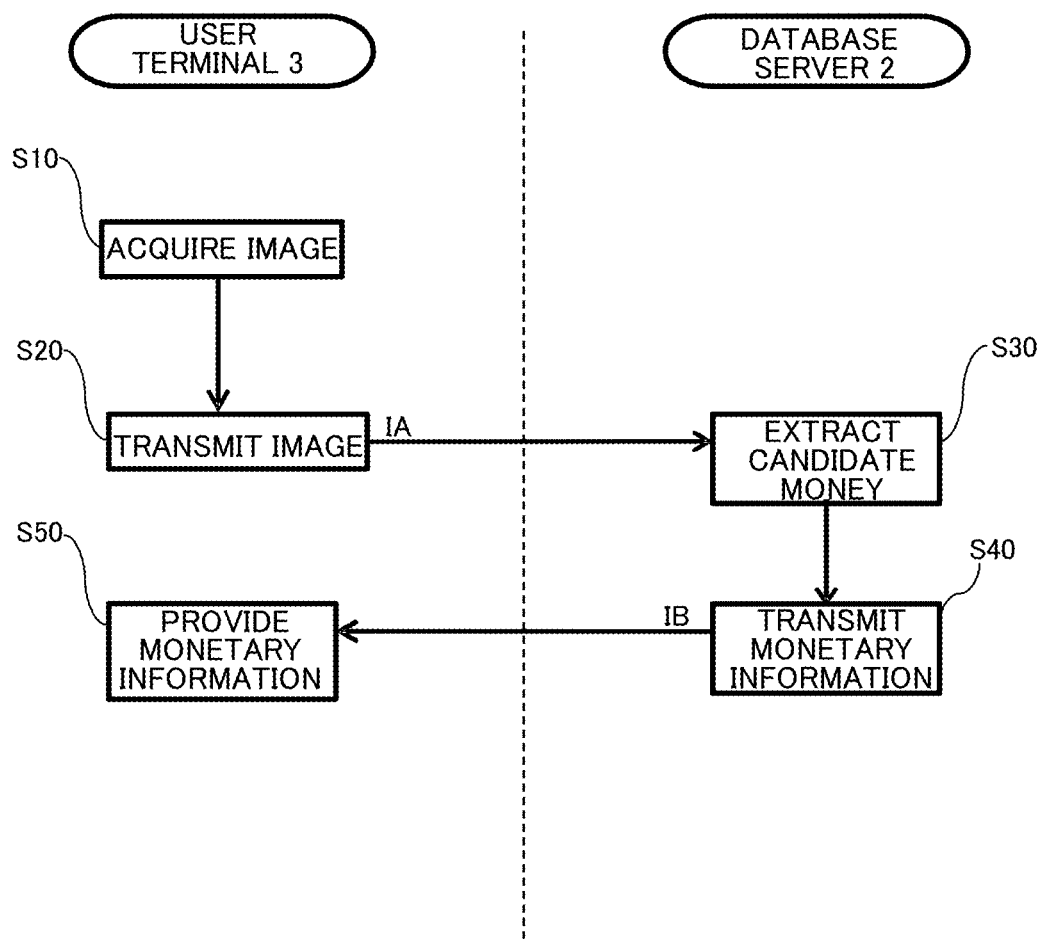
FIG. 6 is a flowchart for explaining a monetary information provision method.

The monetary information provision method of the present embodiment will now be described with reference to FIG. 6. FIG. 6 is a flowchart for explaining the monetary information provision method of the present embodiment.

First, as a preparation, a database (see FIG. 2) in which at least image information Ib1 is accumulated as one of the plurality of types of monetary information D3 for each of more than one type of money 10 is prepared in the storage device 21 of the database server 2.

The monetary information provision method is then executed as shown in FIG. 6 by causing the user terminal 3 to execute the dedicated application previously installed in the user terminal 3 and the database server 2 to execute a dedicated program previously installed in the database server 2.

Specifically, the user terminal 3 acquires the image information IA of search target money in step S10, and transmits the image information IA to the database server 2 in step S20.

In step S30, the database server 2 that has received the image information IA sequentially compares the image information IA with each image information Ib1 of a plurality of types of money 10 stored in the database 21a, and searches for candidate money that can be presumed to be the same type as the search target money from the plurality of types of money 10. That is, the database server 2 extracts more than one type of money having a high degree of similarity R relative to the search target money as candidate money from the plurality of types of money 10. Next, in step S40, the database server 2 transmits the monetary information D3 such as the image information Ib1 and the exchange amount EX of each candidate money to the user terminal 3.

When the user terminal 3 receives the monetary information D3 of each candidate money from the database server 2, the user terminal 3 provides the monetary information D3 to the user by displaying the monetary information D3 on the touch panel 30 in step S50.

[5. Working Effect]

(1) The user can acquire the monetary information D3 of candidate money from the database 2 simply by transmitting the image of the search target money (image information IA) captured by the user terminal 3 to the database 2. Therefore, even when the search target money is a foreign currency, the monetary information D3 of this foreign currency can be easily obtained, and the type of this foreign currency can be easily identified in the present invention. Accordingly, when, for example, a foreigner requires payment in foreign currency at a shop, the shop can accept the payment more easily by identifying the type of the foreign currency. This shop would become easier for foreigners to shop, and thus be able to attract an increased number of foreign customers.

(2) When the image information Ib1 of the candidate money is provided to the user as the monetary information IB, the user can accurately identify the type of the target money based on the image information Ib1 that comprises a large amount of information usable for identifying the banknote.

(3) When the monetary information D3 comprises the degree of similarity R between the search target money and the candidate money, the user can quantitatively identify the search target money based on the degree of similarity R.

(4) When the monetary information D3 comprises determination point information that indicates at least one point for determining the monetary authenticity (i.e. authenticity of money), whether the money is genuine or counterfeit can also be identified, and thus even if the money is an unknown foreign currency, its authenticity can be easily determined.

(5) When the monetary information D3 comprises the exchange amount EX, the value of the search target money can be confirmed more easily.

[6. Others]

(1) In the embodiment described above, the user terminal 3 acquires the image information IA of the search target money by photographing the search target money, but the acquisition method of the image information IA by the user terminal 3 is not limited to this configuration. For example, if the camera function of the user terminal 3 breaks down, the search target money is photographed by another smartphone, and the image information IA of the search target money is transmitted to the user terminal 3 by e-mail or the like. This image information IA then may be transmitted from the user terminal 3 to the database server 2.

(2) When the denomination information Ib3 and the exchange rate information Ib5 of the candidate money are specified, the exchange amount EX of the candidate money can be easily calculated. The following configuration is thus also possible: the database server 2 transmits the denomination information Ib3 and the exchange rate information Ib5 to the user terminal 3, the dedicated application is caused to calculate the exchange amount EX from the denomination information Ib3 and the exchange rate information Ib5, and the user terminal 3 is caused to display this exchange amount EX.

(3) When the target photographed by the user terminal 3 is turn out to be clearly not money during the execution of the dedicated application, the touch panel 30 may notify the user that the target is not money by the function of the dedicated application.

(4) The database server 2 may read the serial number of the search target money from the image information IA, and determine the authenticity of the search target money based on the comparison between this serial number and the serial number information Ib9 for authenticity confirmation in the database 21a. In addition, when the database server 2 determines that the search target money is counterfeit, the database server 2 may transmit the information that the search target money is counterfeit to the user terminal 3, and the user terminal 3 may notify the user that the search target money is counterfeit money. Alternatively or additionally, when the database server 2 determines that the search target money is genuine, the database server 2 may transmit the information that the search target money is genuine to the user terminal 3, and the user terminal 3 may notify the user that the search target money is genuine money. Essentially, when the serial number information of candidate money accumulated in the database server 2 coincides with the serial number of search target money, any mode in which the database server 2 transmits the coincidence information to the user terminal 3, and the user terminal 3 provides the coincidence information to the user may be used.

(5) The database server 2 may extract money 10 having the degree of similarity R exceeding a predetermined threshold value as candidate money. Alternatively, the database server 2 may extract only one type of money having the highest degree of similarity R as candidate money.

(6) In the above embodiment, search target money in one search is one piece of money, but search target money may be more than one piece in one search (search target may be more than one piece of money). Specifically, the user terminal 3 collectively photographs more than one piece of search target money and transmits the image information IA to the database server 2. When the database server 2 detects more than one piece of search target money in the image information IA, the database server 2 searches for candidate money for each search target money and transmits monetary information D3 of each candidate money to the user terminal 3.

The database server 2 may select only money having the highest degree of similarity R as candidate money for each search target money, calculate the total of the exchange amounts EX of all the candidate money and send it to the user terminal 3, and the user terminal 3 may display this total amount of money. Alternatively, the database server 2 may select only money having the highest degree of similarity R as the candidate money for each search target money, and transmit the denomination and the exchange rate information Ib5 of the candidate money to the user terminal 3. In this case, the user terminal 3 may calculate the exchange amount EX of each candidate money from the denomination and the exchange rate information Ib5 of each candidate money, and display the total amount of the exchange amounts EX of all the candidate money. The money having the highest degree of similarity R may be selected as candidate money for each search target money, and the total amount of all the candidate money may be calculated without using the exchange rate information Ib5 and transmitted to the user terminal 3, and then the user terminal 3 may display the total amount of money. That is, when all the candidate money is dollar notes, the total amount of money may be displayed in dollars.

(7) The present invention is applied to identify foreign currency offered for payment by foreigners in the above embodiment, but the present invention may be applied to identify foreign currency the user brought back from a foreign country. Alternatively, while the user is traveling in a foreign country (for example, the United States), the user may set the designated country to the user's home country (for example, Japan) by the country selection button 32 shown in FIG. 3 and transmit the image information IA of the money of the foreign country to the database server 2. The user may then acquire the exchange amount EX of the money of the foreign country (for example, dollar note) into the money of the home country. The value of the money of the foreign country can thus be easily understood.

(8) The monetary information D3 is provided to the user by displaying the information on the user terminal 3 in the above embodiment, but the method for providing the monetary information D3 to the user is not limited to the display. For example, the denomination may be provided to the user by voice.

(9) The database server 2 may acquire the latest information of the exchange rate information Ib5 from the outside via the Internet or the like, and periodically update the exchange rate information Ib5 of the database 21a. Alternatively, the database server 2 does not necessarily store the exchange rate information Ib5 in the database 21a, and may acquire the latest exchange rate information Ib5 from the outside via the Internet or the like every time the database server 2 receives the image information IA of search target money from the user terminal 3.

This application is entitled to and claims the benefit of Japanese Patent Application No. 2018-168801 filed on Sep. 10, 2018, the disclosure of which including the specification, drawings and abstract is incorporated herein by reference in its entirety.

INDUSTRIAL APPLICABILITY

The present invention makes it possible to easily identify the type of foreign currency, for example, to provide an environment where foreigners can easily shop, and to vitalize the market as a result. The contribution of the present invention to industry is thus extremely high.

REFERENCE SIGNS LIST

1 Monetary information provision system
2. Currency database server
3. User terminal
10a, 10b, 10c, 10d, 10z Money
20 Control device
21 Storage device
21a Database
30 touch panel
31 Reshoot button
32 Country selection button
33 Search start button
EX Amount of money (exchange amount)
IA Image information
D3 Monetary information
Ib1 Image information
Ib2 Information of the money circulation country
Ib3 Denomination information
Ib4 Unit information
Ib5 Exchange rate information
Ib6 Size information
Ib7 Material information
Ib8 Authenticity discrimination point information
Ib9 Serial number information
IC Designated country information
R Degree of similarity

The invention claimed is:
1. A monetary information provision system, comprising:
a database server that accumulates monetary image information as one of a plurality of types of monetary information of a plurality of types of money; and an information processing terminal that acquires target image information, and transmits the target image information to the database server, the target image information being image information of a search target, wherein:

the database server searches, by matching the target image information against the monetary image information, for candidate money that is presumed to be the same type as money comprised in the search target from the plurality of types of money, and transmits monetary information of the candidate money to the information processing terminal;

the information processing terminal provides the monetary information of the candidate money;

the database server further accumulates at least one type of information from denomination information, information of a money circulation country, and determination point information that indicates a point for determining monetary authenticity, as at least one of the plurality of types of the monetary information; and the monetary information of the candidate money transmitted to the information processing terminal comprises the at least one type of information.

2. The monetary information provision system according to claim 1, wherein:

the monetary information of the candidate money transmitted to the information processing terminal comprises the monetary image information.

3. The monetary information provision system according to claim 2, wherein:

the database server calculates a degree of similarity between the money comprised in the search target and the candidate money based on the monetary image information of the candidate money and the target image information; and the monetary information of the candidate money transmitted to the information processing terminal comprises the degree of similarity.

4. The monetary information provision system according to claim 1, wherein:

the database server further accumulates exchange rate as one of the plurality of types of monetary information, or the database server acquires the exchange rate as one of the plurality of types of monetary information from an outside upon acquiring the target image information; and the monetary information of the candidate money transmitted to the information processing terminal comprises at least one of the exchange rate and an exchange amount calculated by using the exchange rate.

5. The monetary information provision system according to claim 4, wherein:

the information processing terminal decides a designated country based on an operation received from a user, or decides the designated country based on position information detected by a position detection function, and transmits information of the designated country to the database server; and the database server sets an exchange rate of the designated country as the exchange rate.

6. The monetary information provision system according to claim 1, wherein:

the database server further accumulates exchange rate as one of the plurality of types of monetary information, or the database server acquires the exchange rate from an outside upon acquiring the target image information; and when the database server detects more than one piece of money from the search target based on the target image information, the database server searches for the candidate money for each of the more than one piece of money and transmits, to the information processing terminal, a total amount of a plurality of the exchange amounts obtained from the candidate money; and the information processing terminal provides the total amount.

7. The monetary information provision system according to claim 1, wherein:

the database server or the information processing terminal recognizes a character of a serial number of the search target comprised in the target image information;

the database server further comprises accumulated serial number information, and when the serial number information of the candidate money coincides with the serial number of the search target comprised in the target image information, the database server transmits coincidence information to the information processing terminal; and the information processing terminal provides the coincidence information.

8. A database server for monetary information provision, the database server comprising:

a database that accumulates monetary image information as one of a plurality of types of monetary information of a plurality of types of money; and a control device that searches for candidate money from the plurality of types of money by matching target image information against the monetary image information, and transmits monetary information of the candidate money to an information processing terminal, the target image information being image information of a search target transmitted from the information processing terminal, the candidate money being presumed to be the same type as money comprised in the search target, wherein:

the database further accumulates at least one type of information from denomination information, information of a money circulation country, and determination point information that indicates a point for determining monetary authenticity, as at least one of the plurality of types of the monetary information; and the monetary information of the candidate money transmitted to the information processing terminal comprises the at least one type of information.

9. A monetary information provision method, comprising:

accumulating, by a database, monetary image information as one of a plurality of types of monetary information of a plurality of types of money;

acquiring target image information that is image information of a search target; and searching for candidate money from the plurality of types of money by matching the target image information against the monetary image information in the database, and providing monetary information of the candidate money, the candidate money being presumed to be the same type as money comprised in the search target, wherein:

the accumulating further includes accumulating at least one type of information from denomination information, information of a money circulation country, and determination point information that indicates a point for determining monetary authenticity, as at least one of the plurality of types of the monetary information; and the monetary information of the candidate money transmitted to the information processing terminal comprises the at least one type of information.

10. A non-transitory computer readable storage medium storing a monetary information provision program which, when executed by an information processing terminal, causes the information processing terminal to execute processing comprising:
   transmitting target image information to a database server that accumulates monetary image information as one of a plurality of types of monetary information of a plurality of types of money, the target image information being acquired image information of a search target;
   acquiring monetary information of candidate money from the database server, wherein the candidate money is presumed to be the same type as money comprised in the search target, and the database server searches for the candidate money by matching the target image information against the monetary image information; and
   providing monetary information of the candidate money, wherein:
   the database server further accumulates at least one type of information from denomination information, information of a money circulation country, and determination point information that indicates a point for determining monetary authenticity, as at least one of the plurality of types of the monetary information; and
   the monetary information of the candidate money comprises the at least one type of information.

11. A non-transitory computer readable storage medium storing a monetary information provision program which, when executed by a processor, causes the processor to execute processing comprising:
   acquiring target image information from an information processing terminal, the target image information being image information of a search target;
   searching for candidate money from a database accumulating monetary image information as one of a plurality of types of monetary information of a plurality of types of money by matching the target image information against the monetary image information, the candidate money being presumed to be the same type as money comprised in the search target; and
   transmitting monetary information of the candidate money to the information processing terminal, wherein:
   the database accumulates at least one type of information from denomination information, information of a money circulation country, and determination point information that indicates a point for determining monetary authenticity, as at least one of the plurality of types of the monetary information; and
   the monetary information of the candidate money transmitted to the information processing terminal comprises the at least one type of information.

* * * * *